J. R. FORDYCE & W. R. KEEF.
COTTON GIN.
APPLICATION FILED SEPT. 4, 1912.
1,105,026.
Patented July 28, 1914.
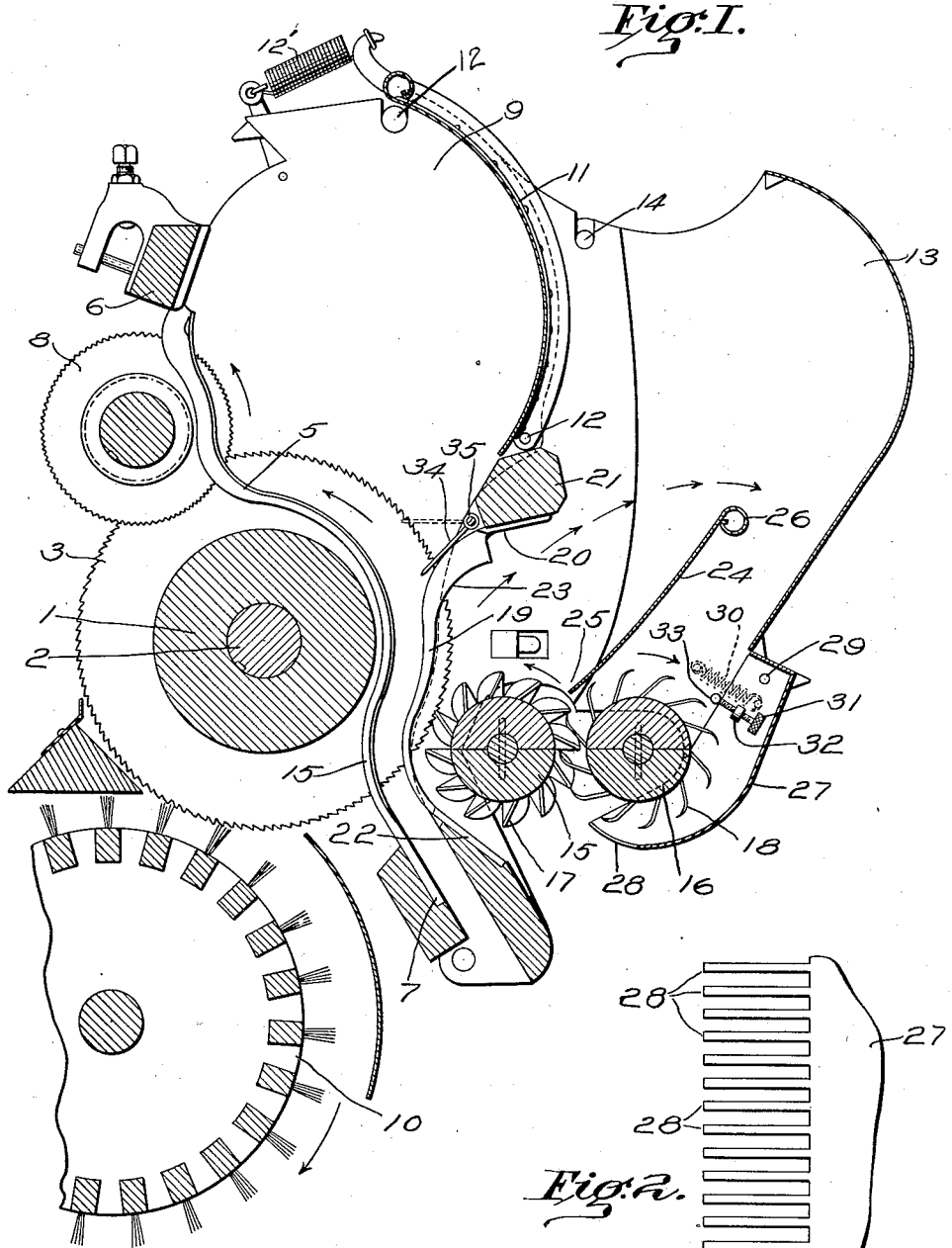
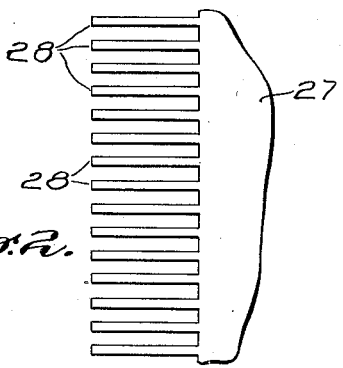
Witnesses:
Inventors:
John R. Fordyce
& William R. Keef,
by Rob't P. Harris,
Att'y.

UNITED STATES PATENT OFFICE.

JOHN R. FORDYCE AND WILLIAM R. KEEF, OF LITTLE ROCK, ARKANSAS.

COTTON-GIN.

1,105,026. Specification of Letters Patent. Patented July 28, 1914.

Application filed September 4, 1912. Serial No. 718,465.

*To all whom it may concern:*

Be it known that we, JOHN R. FORDYCE and WILLIAM R. KEEF, citizens of the United States, residing at Little Rock, in the county of Pulaski and State of Arkansas, have invented an Improvement in Cotton-Gins, of which the following description, in connection with the accompanying drawings, is a specification, like letters on the drawings representing like parts.

The invention to be hereinafter described relates to cotton gins more especially adapted for ginning dirty or trashy cotton containing much of the hulls or broken pods of cotton bolls.

As well understood by those skilled in the art, cotton gins as ordinarily constructed are unable to get rid of the hulls and like trash without stopping the feed and dumping them out by hand, and one of the aims and purposes of the present invention is to provide means whereby the great amount of hulls and bolls found in cotton, especially that brought to the gin toward the latter part of the cotton season, may be readily separated from the cotton-bearing seed without loss of such fiber that should go with the main part of the cotton.

The features constituting the present invention will best be made clear from the following description and accompanying drawings of one form of means for carrying the invention into practical effect, it being understood that details of such means may be varied without departing from the true scope of the actual invention, as definitely pointed out by the claims.

In the drawings: Figure 1 is a section from front to rear of one form of cotton gin embodying the present invention, and Fig. 2 is an enlarged detail showing one form of teeth projecting from the huller shield and extending beneath the fiber-recovering huller roller.

In the form of cotton gin shown, the saw cylinder 1 mounted on the saw shaft 2, carries the usual series of saws 3, which, by appropriate means, as usual, are driven in the direction of the arrow, Fig. 1. The saws 3 are preferably separated a distance longitudinally of the saw cylinder, sufficient to permit the denuded seed to pass between, and extending between adjacent saws are the seed conveyers 5, one end of each of which may be secured to the upper part of the main frame at 6 and the other end at a point 7 preferably below the saws, substantially as in the application of John R. Fordyce, Serial No. 622,650, filed April 22, 1911.

Above the saws and overlapping the same are a series of doffer disks 8, which may also project beyond the seed conveyers 5 into the roll box 9, the construction being such that the cotton-bearing seed will be stripped of its fiber at the intersection of the saws and doffing disks 8, and while the fiber will pass with the saws from the roll box and be removed from the saws by appropriate means, such as the brush 10, the seed, now cleaned of its fiber, will pass onto the seed conveyers 5 between the saws and finally out of the machine, substantially as set forth in the Fordyce application mentioned.

The gin breast 11 is preferably mounted pivotally at 12, Fig. 1, and its upper end portion may be yieldingly sustained in position by a suitable spring 12'. Means are provided as usual, to rotate the saws, the doffers, and the brush in the direction of the arrows, but as these features are now well understood by those skilled in the art and form no essential part of the present invention, detail showing and description thereof are unnecessary.

Mounted in front of the gin is the receiving hood or box 13, which may be of appropriate form and character to receive the cotton-bearing seed from a source of supply, such, for instance, as a feeder of the cleaning variety, if desired. The receiving hood or box 13 may be pivotally supported at 14, so that at times it may be turned up to reach parts ordinarily covered.

Suitably mounted to extend in parallel relation with the saw cylinder at the lower open end of the receiving hood or box are the two rollers 15 and 16, the former of which is provided with a series of throwing blades or spikes 17, which, as will more fully appear, serve to throw or carry the cotton and seed to the ginning saws 3. The roller 16 is also provided with teeth, but of a character to engage and carry any cotton or fiber that may find its way into the adjacent portion of the receiving hood or box, and deliver the same to the blades or spikes of the roller 15 while permitting any hulls, bolls or broken seed to escape, as will more fully appear.

The two rollers 15 and 16 are rotated in the direction of their respective arrows;

that is to say, the roller 15 rotates contra-clockwise viewing Fig. 1, and its teeth or blades incline backwardly with relation to the direction of rotation, with the result that any fiber or fiber-bearing seed engaged by such teeth or blades will be thrown upwardly toward the gin saws. The roller 16, however, rotates in the opposite direction and its teeth 18 incline forwardly with respect to the direction of rotation, the teeth 18 also being pointed or sharpened, the result being that any fiber or fiber-bearing seed that may be engaged by the teeth 18 of roller 16 will be retained by said teeth while any hulls, bolls, or other waste will be eliminated.

The teeth of the rolls 15 and 16 overlap, as indicated in Fig. 1, and the roll 15 is rotated at greater speed than roll 16, whereby, any fiber or fiber-bearing seed carried by the sharp teeth of roll 16, will be taken or detached therefrom by the teeth of the more rapidly moving roll 15 and thrown to the gin saws, as will presently appear.

As hereinbefore noted, one of the objects of the present invention is to eliminate the hulls, bolls, and other waste that are usually found in seed cotton, especially toward the end of the cotton season, and to reclaim the fiber in a clean and desirable condition without loss and by continuous, or substantially continuous operation of the machine.

As a means to this end in connection with the rollers 15 and 16 and their characteristic operation as described, provision is made for causing any hulls, bolls, and other waste, that may be delivered by the roller 15, to be thrown out of the zone of the gin saw action and expelled from the gin. In the form of the invention illustrated, this throwing device comprises a series of ribs extending between adjacent saws and having a throwing portion against which the hulls, bolls, or other waste will be violently projected by the roll 15, whereby they will be given a direction of movement to carry them out of the machine. These ribs 19, Fig. 1, may have their upper ends 20 secured to the cross beam 21 and their lower ends 22 secured below the axis of the roller 15, as shown, but obviously they may be otherwise secured in place. Between their upper and lower ends the ribs 19 extend between the saws and have a throwing portion 23, such that bolls, hulls, and waste impinging thereagainst by being thrown from roll 15, will take the direction of the series of arrows, Fig. 1, it being understood that the ribs 19 are sufficiently separated to permit the saws to engage and carry with them the lint-bearing seed. It may not be necessary in every case to form a separate set of ribs 19, as obviously the throwing portion which directs the bolls, hulls, and waste in the direction stated may be formed on the seed conveyers or other ribs, as will be clearly obvious.

Secured to the receiving hood or box 13 is a deflector 24 preferably formed as a board-like downwardly extending partition in said hood or box 13, the lower end 25 projecting between the two rolls 15 and 16. The deflector 24 is secured to or supported by the side walls of the hood or box 13, as at 26, or it may be to a rod extending between said walls, the upper end portion being so disposed that hulls, bolls, or other waste thrown from the throwing portion of the ribs will pass over and back of the deflector. This deflector, it will be noted, forms a partition in the box 13 part-way up from between the rolls 15 and 16, and any hulls, bolls, or other waste passing over this partition will fall in front of the partition and fall into the sphere of action of the roller 16. Should any fiber be thus brought into the sphere of action of the roller 16, the forwardly projecting teeth will engage and carry it to the blades of roller 15 which will return it to the saws, as already described.

To enable the hulls, bolls, and other waste to escape from the machine after passing over and in front of the deflector 24, the hood or box 13 is provided at its lower portion with a huller shield 27, the lower part of which extends beneath the roller 16 and is formed with a series of fingers 28 which will permit the hulls, bolls, and other waste to escape. In order to effectively regulate this action, the huller shield 27 is pivotally mounted at 29 and is yieldingly held in desired position by a spring 30, one end of which is detachably connected to the wall of box 13 and the other end to the huller shield 27, as shown.

To adjustably regulate the position of the huller shield it may be provided with an adjustable bearing pin 31 preferably screw-threaded through the lug 32 and having its end bearing against the pin 33 or other projection on the wall of box 13, the construction being such that should any unusually large, hard substance, as a stone or the like, find its way between the roller 16 and the huller shield 27, the latter may yield to prevent breaking the teeth of the roller, and thus eliminate the large object without injury to the machine.

Since the roller 15 with its teeth serves primarily as a throwing roller to throw the material to the saws and against the ribs, it may, for identification, herein be referred to as a huller throwing roller; and likewise since the roller 16 serves to separate the fiber from the hulls, bolls, and other waste and deliver it to the roller 15, it may, for identification, be referred to as the huller separating roller; but neither of these terms are to be understood as terms of limitation, but merely of identification.

It will be noted that above the ribs 19 are a series of fingers 34 pivotally mounted at 35 at the lower portion of the roll box, and these may be moved from full to dotted line position or the contrary to properly enable the saws to carry the cotton-bearing cotton seed to the roll box and to maintain the seed therein fully treated.

While the present invention has been shown as associated with a gin of the doffer disk type, it is to be understood that the invention is not restricted thereto, but may be employed in connection with any type of gin suitable to the purposes of the invention without departing from the actual scope thereof, as pointed out by the claims.

Cotton is fed into the receiving box 13 from a source of supply, such as a cleaner feeder, and strikes the deflector 24 by which it is directed to the roller 15. This roller throws the material upward into the action of the gin saws by which the fiber and seed are carried to the throwing portions of the ribs 19 or their equivalent, which permit the fiber and seed to pass but throws back the hulls, bolls, and waste in the direction of the arrows, Fig. 1, and over the top of the deflector. This waste material then drops into the field of action of the roller 16 which, by reason of its teeth, engages any fiber and transfers it to the action of the roller 15, by which it is again transferred to the saws, but any bolls, hulls, or waste is allowed to escape between and over the ends of the teeth or fingers 28 of the huller shield. Should any unusually large substance find its way between the roller 16 and huller shield, the latter will yield to permit it to escape without breaking the teeth of the huller separating roller.

What is claimed is:

1. In a cotton gin, the combination of a receiving box or hood having a deflector dividing the same into two compartments, and mounted to provide a passageway for hulls, bolls, and the like over the top of said deflector, a huller separating roller and a huller throwing roller at the lower portion of the box or hood, a series of saws, a series of ribs extending between the saws and having portions to direct hulls, bolls, and waste over the top of the deflector when thrown against the ribs by the throwing roller.

2. In a cotton gin, the combination of a receiving box or hood having a partition dividing it into two compartments, a huller throwing roller in one of said compartments, a huller separating roller in the other of said compartments, a series of saws, a series of ribs extending between the saws, said ribs having throwing portions to direct hulls, bolls, and waste over the partition into the compartment above the huller separating roller.

3. In a cotton gin, the combination of a series of gin saws, a receiving box or hood having a partition or deflector therein, dividing the box or hood into two compartments connected by a passageway above said partition or deflector, a huller throwing roller, a series of ribs extending between the saws and having throwing portions separated a distance to permit seed cotton to pass and to throw bolls, hulls and waste out of the zone of action of the saws when projected thereagainst by the huller throwing roller.

4. In a cotton gin, the combination of a series of saws, a receiving box or hood, a huller throwing roller and a huller separating roller in said box or hood, a partition in said box or hood extending upward from a point between said rollers, and a series of saws having throwing portions to permit seed cotton to pass with the saws and to throw bolls, hulls and waste from the saws over the top of said partition.

5. In a cotton gin, the combination of a series of saws, a receiving box or hood, a huller throwing roller and a huller separating roller in said box or hood, said huller throwing roller having backwardly inclined teeth, and the huller separating roller having forwardly inclined teeth, a partition in said box or hood extending upward from a point between said rollers, and a series of saws having throwing portions to permit seed cotton to pass with the saws and to throw bolls, hulls and waste from the saws over the top of said partition.

6. In a cotton gin, the combination of a receiving box, a huller throwing roller and a huller separating roller in the lower part thereof, a partition extending upward in said box from a point between said rollers, means for directing bolls, hulls, and waste over the top of the partition when thrown by the huller throwing roller, and a huller shield having fingers extending below the huller separating roller.

7. In a cotton gin, the combination of a receiving box, a huller throwing roller and a huller separating roller in the lower part thereof, a partition extending upward in said box from a point between said rollers, means for directing bolls, hulls, and waste over the top of the partition when thrown by the huller throwing roller, a huller shield having fingers extending below the huller separating roller, and means for yieldingly maintaining the shield in position.

8. In a cotton gin, the combination of a receiving box, a huller throwing roller and a huller separating roller in the lower part thereof, a partition extending upward in said box from a point between said rollers, means for directing bolls, hulls, and waste over the top of the partition when thrown by the huller throwing roller, a huller shield pivotally mounted on the receiving box and having fingers extending below the huller separating roller, and means for adjusting the said shield.

9. In a cotton gin, the combination of a receiving box, a huller throwing and a huller separating roller in the lower portion of said box, a series of gin saws, a series of ribs having curved throwing portions separated to permit passage of seed cotton and adapted to throw hulls, bolls, and waste out of the zone of saw action, and a series of fingers extending below the huller separating roller and yieldingly mounted to permit the discharge of foreign bodies.

In testimony whereof, we have signed our names to this specification, in the presence of two subscribing witnesses.

JOHN R. FORDYCE.
WILLIAM R. KEEF.

Witnesses:
G. F. WILLIAMS,
GEO. H. ASAND.